(12) United States Patent
Van Der Kall

(10) Patent No.: US 6,937,426 B2
(45) Date of Patent: Aug. 30, 2005

(54) POSITIONING CONTROL FOR READ AND/OR WRITE HEAD

(75) Inventor: Herman Petrus Van Der Kall, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 777 days.

(21) Appl. No.: 10/056,143

(22) Filed: Jan. 24, 2002

(65) Prior Publication Data

US 2002/0110052 A1 Aug. 15, 2002

(30) Foreign Application Priority Data

Jan. 24, 2001 (EP) .............................................. 01200237

(51) Int. Cl.⁷ ................................................. G11B 5/55
(52) U.S. Cl. ................................... 360/78.04; 369/44.27
(58) Field of Search ........................... 360/78.09, 78.07, 360/78.04, 78.01, 77.01, 77.02, 48, 61, 60, 78.14, 78.06; 369/44.27, 44.29, 275.1

(56) References Cited

U.S. PATENT DOCUMENTS

| 4,972,403 A | * | 11/1990 | Van Rosmalen et al. | 369/275.1 |
| 5,668,680 A | | 9/1997 | Tremaine | 360/78.07 |
| 6,243,336 B1 | * | 6/2001 | Schell et al. | 369/44.29 |
| 6,307,705 B1 | * | 10/2001 | Anderson et al. | 360/78.04 |

FOREIGN PATENT DOCUMENTS

| EP | 0540114 A1 | 5/1993 |
| EP | 0607045 A1 | 7/1994 |

* cited by examiner

Primary Examiner—Ali Neyzari
(74) Attorney, Agent, or Firm—Michael E. Belk

(57) ABSTRACT

In a device (1) for reading and/or writing information from and on, a track on a medium (2), a read and/or write head (3) can be positioned with a positioning device (5, 20) relative to the medium (2). The read and/or write head (3) comprises a carriage (21) and means (22) for maintaining the reading and/or writing in a scanning point at the track during a transverse positioning of the track relative to the carriage (24). A control circuit (6) is present for controlling the positioning device (5, 20). There is a period of the order to magnitude of one millisecond between the supplying of a control signal to the positioning device (5, 20) at a first point in time based upon which the read and/or write head (3) has to be positioned and the actual start of the movement of the read and/or write head (3). The first point in time is before the point in time at which the maintaining means (22) reach the end of the track that is being read or written at the first point in time. The carriage (21) already moves at a certain velocity and has already been moved over a certain distance (D) when the maintaining means (22) reach the end of the track which is read or written.

4 Claims, 3 Drawing Sheets

POSITIONING CONTROL FOR READ AND/OR WRITE HEAD

The invention relates to a device for reading and/or writing information from and on, respectively, a track on a medium, comprising a read and/or write head which is movable in transverse direction relative to said track and comprising a carriage which can be moved in transverse direction by positioning means and means for maintaining the reading and/or writing operation at a scanning point on the track during a movement in transverse direction of the track relative to the carriage, means for supplying to a control circuit a signal representative of a desired change in the position of the read and/or write head in transverse direction from an initial position to a final position, which control circuit is arranged for processing information from said representative signal into control signals for said positioning means, and which control circuit is furthermore arranged for generating a control signal at a first point of time and supplying said signal to the positioning means so as to cause them to move the read and/or write head from the initial position to the final position.

Such a device is known from U.S. Pat. No. 5,668,680. Said document describes that during a search operation, in which the read and/or write head moves from an initial position to a final position, which final position is indicated, a servo system generates control signals that cause the read and/or write head to initially accelerate and subsequently decelerate as the head approaches the final position. The head passes through a certain velocity profile upon moving from the initial position to the final position, while the shape of the velocity profile depends on inter alia the number of tracks covered in a seek operation. The velocity profile includes an acceleration portion, during which the head accelerates from an initial radial velocity to a maximum velocity, and, subsequently, a deceleration portion, during which the head decelerates from the maximum velocity to a near-zero velocity at the final position.

Such a search operation generally takes up a few dozen milliseconds, including the time that is needed for making the necessary calculations to ensure that the correct control signals for the driving means will be generated at the correct points of time, counting from the time when a signal indicating that the head is to be moved from the initial position to the final position is generated.

It has been found that a certain time, also called dead time, in the order of one to a few milliseconds, passes between the generation of a control signal indicating to the actuating means that, and by how much and in what direction, the read and/or write head is to be moved and the actual start of the movement of the read and/or write head from the initial position.

There are several possibilities of recording information on a medium. The information can, for example, be recorded in the form of an optical or magnetic pattern. The point on the track on the medium that is being read or written at a particular point in time will be called the scanning point hereinafter.

Generally, the read and/or write head of a device for reading and/or writing information from and/or on an optical medium comprises a radiation source and optical means for focussing the radiation generated by the radiation source in the scanning point on the storage medium. In order to be able to read information from the medium, the read and/or write head furthermore comprises optical means for representing radiation reflected from the medium on an optical detector. The latter means may coincide partially or entirely with the optical means for the purpose of focussing the radiation generated by the radiation source in the scanning point on the storage medium.

Generally it is desirable to have a possibility to locally move the scanning point in transverse direction with a given position of the carriage. Several solutions are available for accomplishing this. In the case of optical mastering systems, for example, this is realized by means of an electro-acoustic modulator, which deflects a radiation beam to a greater or smaller extent in dependence on a voltage that is applied to the modulator. In the case of a device for consumer applications, however, this solution is too costly. More appropriate in that case is an embodiment wherein the read and/or write head comprises a part that can be moved by means of an actuator. The movable part is a lens, for example, or a reflecting element that forms part of the optical means. The means for maintaining the reading and/or writing operation in the scanning point on the track during a movement in transverse direction of the track relative to the carriage will be called maintaining means hereinafter.

The object of the invention is to diminish the consequences of the dead time that passes between the generation of control signal, based upon which the read and/or write head is to be moved, and the actual start of the movement of the read and/or write head.

In order to accomplish this object, the invention is characterized in that said first point of time occurs at a moment when the maintaining means of the read and/or write head are still reading and/or writing the track in the scanning point at the initial position.

As a result, the reading and/or writing operation can normally continue during the dead time, because the read and/or write head has not yet left the initial position at that time. Furthermore, a considerable percentage of the time that is required for a search operation, a few dozen milliseconds, is reduced by the dead time of one to a few milliseconds. Expressed as a percentage, the gain in time is of the order of 10%.

A preferred embodiment of a device according to the invention is characterized in that said first point in time occurs at a moment when the carriage is already moving from the initial position to the final position, at which moment the maintaining means of the read and/or write head are still reading and/or writing the track in the scanning point at the initial position.

As a result, the read and/or write head continues to follow the track, so that the reading or writing operation can normally continue while the carriage has already left the initial position and is on its way to the final position.

Another preferred embodiment of the invention is characterized in that said first point in time occurs at such a moment that the end of the track to be read and/or written is reached at a moment when the carriage is already moving from the initial position to the final position while the scanning point is still on said track.

As a result, the carriage is already on its way from the initial position to the final position as much as possible when the end of the track is reached, while reading or writing is continued until the end of the track.

Another preferred embodiment of a device according to the invention is characterized in that the control circuit is furthermore arranged for carrying out a signal processing operation, wherein the direction of the desired change of position relative to the initial position is derived from said representative signal, and for supplying the signal to the first positioning means already at the first point in time so as to initiate the change of position in the direction derived from said representative signal before all the information from said representative signal has been processed by the control means.

The processing of the representative signal into control signals takes one to a few milliseconds. On the other hand, the direction in which the read and/or write head is to be moved is known from the representative signal after a few microseconds already, whereas the magnitude of said movement is not known yet. The idea underlying this embodiment of the invention is that the knowledge of the direction in which the read and/or write head is to move can be used already for generating the signal for the first positioning means, while the processing of the representative signal in the control circuit is not completed yet and will not be completed until the read and/or write head has actually started to move.

The invention will now be explained in more detail with reference to the accompanying drawing, wherein.

Figure 1:
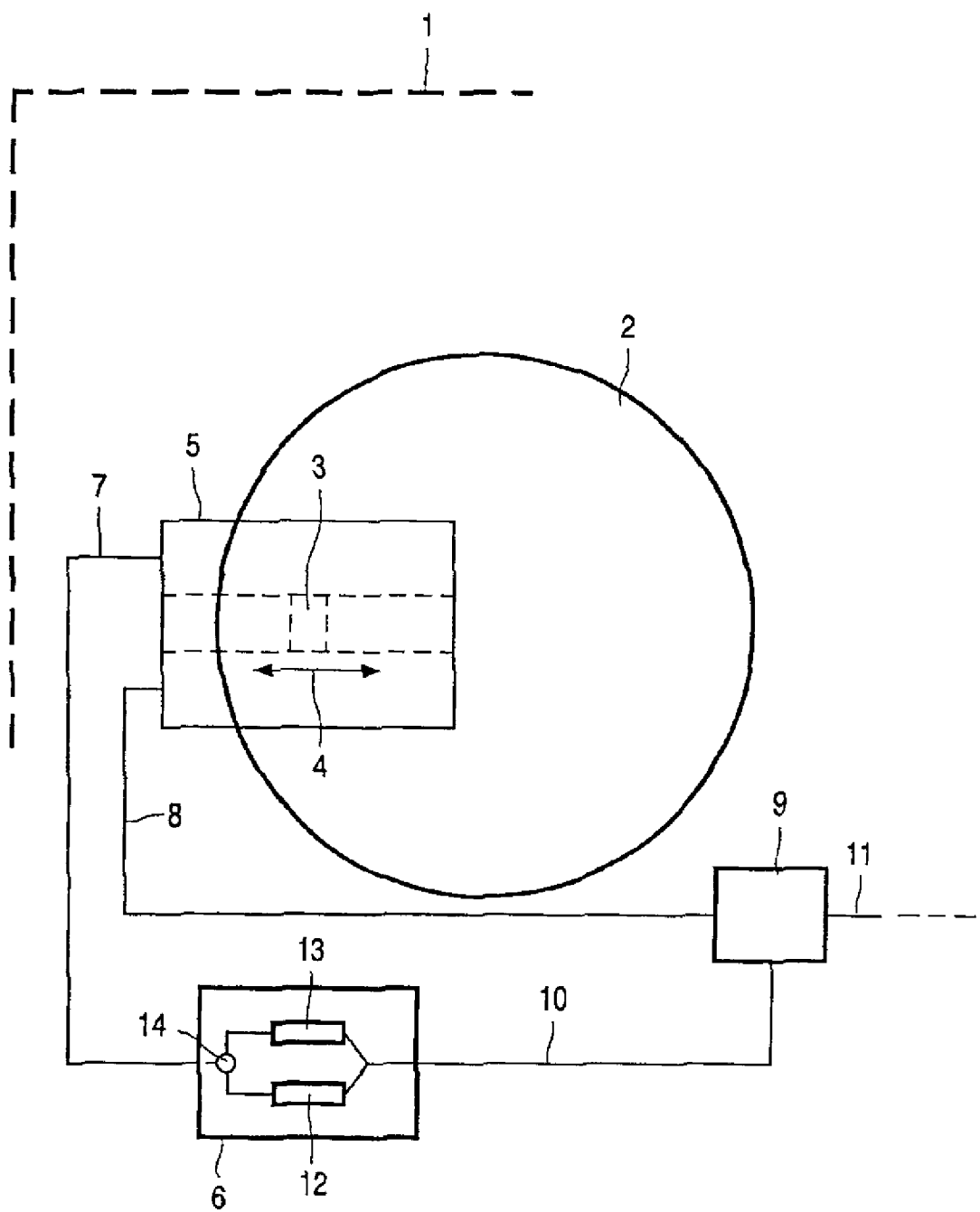
FIG. 1 is a schematic representation of a device according to the invention.

In FIG. 1, reference number 1 indicates a device for reading and/or writing information from and on, respectively, a medium. In the exemplary embodiment of FIG. 1, said medium is in the form of a rotatable flat disc 2, on which information is present or on which information can be recorded in a manner which is known per se, for example CD, DVD, CD-ROM, DVD-ROM, CD-R, CD-RW etcetera. The reading and/or writing of the information from and onto the medium 2 take(s) place by means of a read and/or write head 3.

Read and/or write head 3 can be moved to and fro in the direction indicated by the two-way arrow 4 by means of the first positioning means. The first positioning means 5 comprise, for example, a schematically represented motor 20 (FIG. 2) and a carriage 21 for the read and/or write head 3. Other embodiments for the first positioning means 5 are known per se, see U.S. Pat. No. 5,668,680, for example. The first positioning means 5 are known per se and will not be discussed in more detail herein. Control signals for the first positioning means 5 are supplied from a control circuit 6 via a line 7. The first positioning means 5 and/or the read and/or write head 3 are arranged in a manner which is known per se for detecting the position of the read and/or write head 3 relative to the medium 2, which detection is applied to a comparator circuit 9 as a position signal via a line 8. One output of the comparator circuit 9 is connected to the control circuit 6 via a line 10. Connected to a second input of comparator circuit 9 is a line 11, via which a signal representative of a desired change in the position of the read and/or write head 3 from an initial position to a final position can be supplied to comparator circuit 9. Comparator circuit 9 is capable of comparing the actual position of the read and/or write head 3, which is present on line 8 in the form of a position signal, with the desired final position as represented by the representative signal that enters comparator circuit 9 through line 11. The representative signal may be obtained from information read by the read and/or write head 3, but also from a programmed device which the present device for reading and/or writing forms part of.

Control circuit 6 is arranged for supplying a signal that enters through line 10 both to a processing circuit 12 and to a processing circuit 13. Control circuit 6 also comprises a combining unit 14, in which output signals from the processing circuits 12 and 13 can be combined into one signal, which is supplied to line 7 from combining circuit 14.

Processing circuit 12 is a prior art circuit which is known per se, which is capable of deriving from the representative signal on lines 11 and 10 control signals for the first positioning means 5 for the purpose of moving the read and/or write head 3 from the initial position to the final position as represented by the representative signal.

Processing circuit 13 is arranged for carrying out a signal processing operation, whereby at least, and preferably only, the direction of the desired change of position of the read and/or write head 3 relative to the initial position is derived from the representative signal. It is noted that the processing circuit 13 may form a physical part of the processing circuit 12, and if processing circuit 12 comprises a programmable device, possibly cannot even be physically distinguished therefrom.

Figure 2:
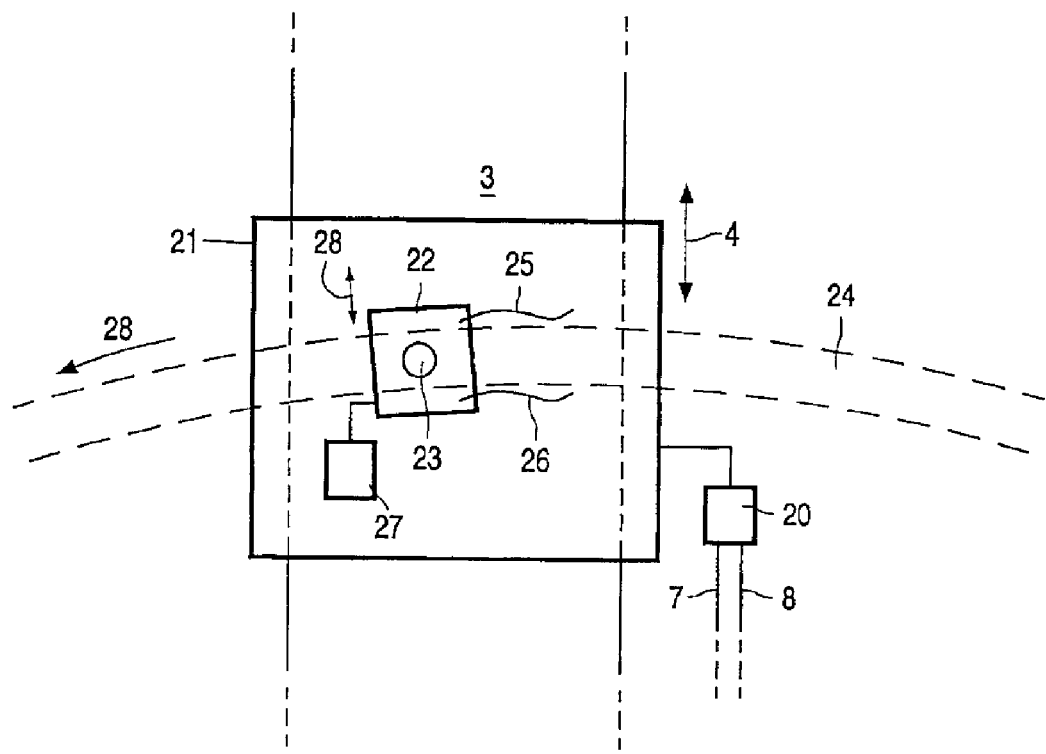
FIG. 2 is a more detailed schematic representation of a part of the device according to FIG. 1.

FIG. 2 shows the read and/or write head 3 in more detail. The read and/or write head 3 comprises a carriage 21, as well as maintaining means 22. In this embodiment, the maintaining means 22 are suspended from carriage 21 in such manner as to be capable of slight springing movement, for example by means of leaf springs 25 and 26. Other embodiments for the suspension of the maintaining means 22 are known per se. Reference number 23 represents a lens, for example, which is used as a maintaining means and which focuses radiation from a radiation generator (not shown) on a track 24 of the medium 2. In a manner known per se, control signals are generated from signals which are picked up from the track 24 via lens 23, which control signals are intended for an actuator 27 which is capable of moving the maintaining means to and fro in the direction of the two-way arrow 28. The directions of movement that are indicated by two-way arrows 24 and 28 extend transversely to the track 24. The positioning means 5 comprise a motor 20, which is capable of moving the carriage 21 in the direction of the two-way arrow 4. The track 24, which moves in the direction indicated by the arrow 28, for example, will not at all times be present at a position such that the lens 23 can focus the radiation on the correct position within the track 24 without being repositioned. If the medium is a rotatable flat disc, for example, the track 24 may have a spiral form, as a consequence of which the position of the track 24 will vary either in upward direction or in downward direction seen in FIG. 2 with every revolution of the flat disc 2. Another unevenness occurs, for example, if a hole in a flat rotatable disc 2 is not precisely centred. In the case of carriage 21 taking up a fixed position, such movements of the track 24 are followed by means of actuator 27, which causes the maintaining means 22 to move in transverse direction relative to the track 24, while the leaf springs 25 and 26 ensure that the maintaining means are always urged to a position of equilibrium at all times. In this manner it is possible for the maintaining means 22 to read or write a number of tracks 24 lying side by side in those cases where carriage 21 takes up a fixed position. In some cases, however, it is necessary to make a leap across a larger number of tracks, which leap is too large, given the amount of travel in the direction of double arrow 28 that is available for the maintaining means 22. The carriage 21 must be moved in the direction of two-way arrow 4 in that case. To this end a motor 20 is provided, which forms part of the positioning means 5.

Figure 3:
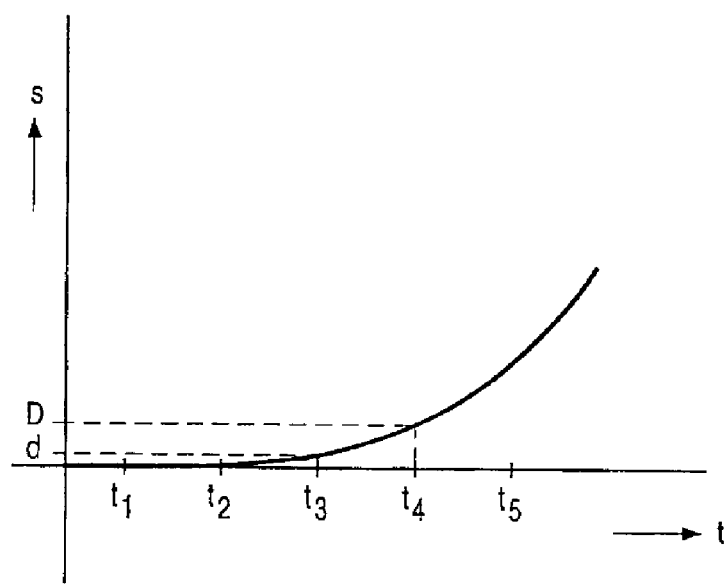
FIG. 3 is a time diagram, in which the path traveled by the carriage is plotted as a function of time.

FIG. 3 shows how the position of the carriage 21 changes as a function of time in response to a control signal via line 7, as a result of which motor 20 will set carriage 21 moving. At a first point of time t1, the signal reaches motor 20 via line 7. Only after some time, at point of time t2, will the carriage 21 start to move. During the period between t1 and t2 the carriage 21 will remain in the initial position. Only then will the accelerated movement of carriage 21 start.

Figure 4:
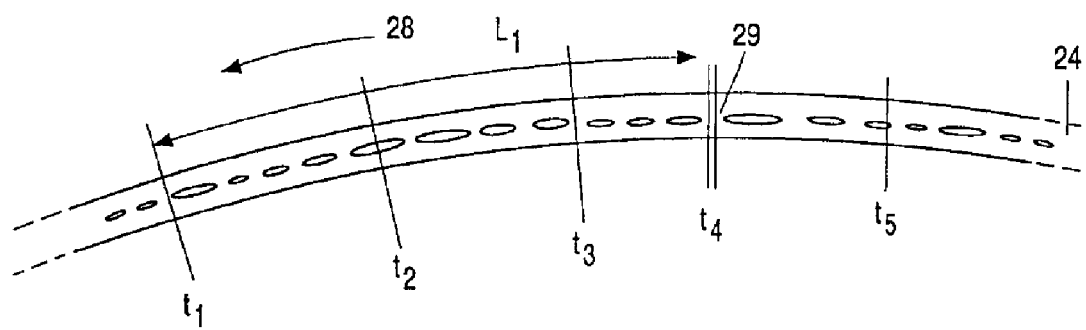
FIG. 4 is a representation of a track on an information carrier, on which several points in time are shown.
Figure 5:
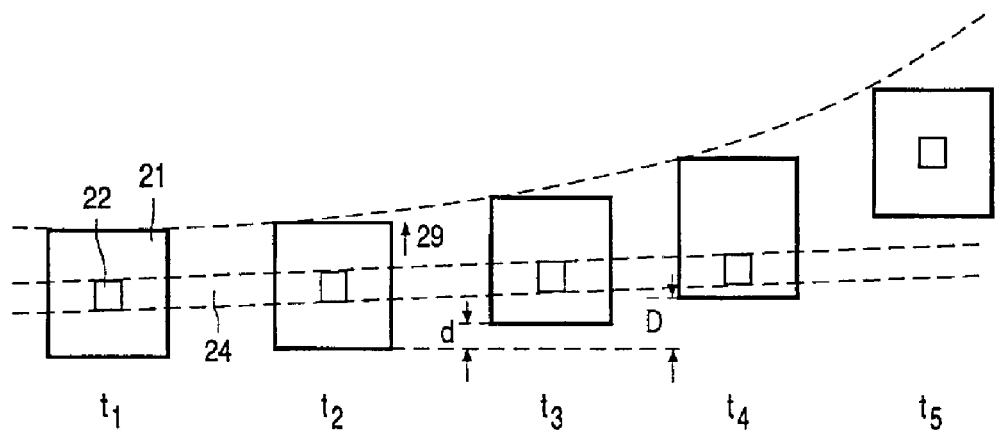
FIG. 5 is a representation of the position of the carriage and the actuator relative to the track at the points in time that are shown in FIG. 4.

FIG. 4 shows several points of time, among which the aforementioned points of time t1 and t2, relative to a track 24. In FIG. 4, reference number 29 indicates the position on the track 24 on which the information that is to be read or written ends on track 24 and must be continued on another track which is so far removed from track 24 that actuator 27 is unable to move the maintaining means 22 over a distance so that lens 23 will be capable of detecting the new track, so that it will be necessary to move carriage 21 from an initial position to a final position. It is noted that FIG. 4 is not drawn to scale. According to the prior art, the signal at the first point of time is delivered at the moment when the maintaining means 22 are present at position 29, the position where the track to be read or written ends. The result of this is that the maintaining means 22 will continue to follow track 24 for some time, the period between t1 and t2 as shown in FIG. 3, before carriage 21 starts to move. According to the invention, the signal is delivered at the first point of time t1, where the maintaining means 22 are still removed from position 29 by a distance L1. FIG. 4 also shows point of time t2, which corresponds to point of time t2 in FIG. 3. At point of time t2 the positions of carriage 21 and maintaining means 22 are still exactly the same (see FIG. 5) as at point of time t1, not taking into account any movements of the maintaining means 22 to follow track 24, for example, as a result of a rotatable flat disc not being properly centred. All this is also shown in FIG. 5 in which track 24 is shown to be straight for the sake of clarity, and wherein only the contours of the carriage 21 and the maintaining means 22 are shown relative to the track 24 (which is not shown to scale). The FIG. clearly shows that the positions of carriage 21 and maintaining means 22 have not changed yet at point of time t1, nor at point of time t2, except for the above-described movements of the maintaining means 22 relative to carriage 21 for the purpose of following the track 24, of course. Then, from point of time t2, the carriage 21 starts to move in the direction indicated by arrow 29. At point of time t3 carriage 21 has been moved a distance d in the direction indicated by arrow 29. The maintaining means 22 make a movement in opposite direction under the influence of actuator 27, as a result of which, however, the lens 23 will continue to follow the track 24. The distance d is smaller than the amount of travel relative to the carriage 21 that actuator 27 can cause you the maintaining means 22 to make. At the point of time t4 the carriage 21 will have traveled a distance D already. It should furthermore be realized that the carriage 21 has not only traveled some distance, but that, in addition, its velocity has steadily increased after point of time t2, as is apparent from FIGS. 3 and 5, as a result of which the distance traveled by the carriage 21 relative to the track 24, represented as a function of time, is shown in the form of a curve in FIG. 5. At point of time t4 the maximum relative movement that is possible between maintaining means 22 and carriage 21 is almost reached. In this way the fact that the carriage 21 can already move in the direction of the next position, the final position, whilst the maintaining means 22 can continue to follow the track 24 until position 29 has been optimally utilized. The time that is gained in comparison with the above-described prior art in this manner is the period t1 to t4.

A preferred embodiment of a device according to the invention will now be discussed with reference to FIG. 1.

The control circuit 6 comprises a processing circuit 13. Processing circuit 13 is arranged for carrying out a signal processing operation, where at least, and preferably only, the direction of the desired change of position of the read and/or write head 3 relative to the initial position is derived from the representative signal. The signal that indicates the direction of the desired change of position is already supplied to motor 20 over line 7 via the combining unit 14, as a result of which the above-described process will commence at point of time t1. When motor 20 is started at point of time t1, it is not absolutely necessary yet to know the desired final position of carriage 21. It suffices to know the direction in which carriage 21 will have to be moved. The information about the desired final position of the carriage 21 can subsequently be obtained from the processing circuit 12, via combining circuit 14, while the carriage 21 starts to move.

In the foregoing the invention has been described by means of a hardware version as shown in FIG. 1, which comprises a comparator circuit 9 and a control circuit 6, which control circuit 6 includes a processing circuit 12, a processing circuit 13 and a combining circuit 14. Also software or firmware implementations of the invention are possible, however, where the software or the firmware performs the functions that have been described above for the comparator circuit 9, the processing circuit 12, the processing circuit 13 and the combining circuit 14. Also the software and/or firmware implementations embody the present invention.

After reading the foregoing, numerous embodiments will readily suggest themselves to those skilled in the art. The invention is considered to comprise all such embodiments.

What is claimed is:

1. A device for reading and/or writing information from and on, respectively, track (24) on a medium (2), comprising a read and/or write bead (3) which is movable in transverse direction relative to said track (24) and comprising a carriage (2) which can be moved in transverse direction by positioning means (5, 20) and means for maintaining the reading and/or writing operation at a scanning point on the track during a movement in transverse direction of the track relative to the carriage, means (10) for supplying to a control circuit (6), a signal representative of a desired change in the position of the read and/or write head (3) in transverse direction from an initial position to a final position, which control circuit (6) is arranged for processing information from said representative signal into control signals for said positioning means (5, 20), and which control circuit (6) is furthermore arranged for generating a control signal at a first point of time and supplying said signal to the positioning means (5, 20) so as to cause them to move the read and/or write head (3) from the initial position to the final position, characterized in that said first point of time occurs a moment when the maintaining means (22) of the read and/or write head (3) are still reading and/or writing the track (24) in the scanning point at the initial position.

2. A device as claimed in claim 1, characterized in that said first point of time occurs at a moment when the carriage (21) is already moving from the initial position to the final position, at which moment the maintaining means (22) of the read and/or write head are still reading and/or writing the track (24) in the scanning point at the initial position.

3. A device as claimed in claim 1, characterized in that said first point in time occurs at such a moment that the end (29) of the track (24) to be read or written is reached at a moment when the carriage (21) is already moving from the initial position to the final position while the scanning point (22) is still on said track (24).

4. A device as claimed in claim 1, characterized in that the control circuit (6) is furthermore arranged for carrying out a signal processing operation (13), wherein the direction of the desired change of position relative to the initial position is derived from said representative signal, and for supplying the signal to the positioning means (5, 20) already at the first point in time so as to initiate the change of position in the direction derived from said representative signal before all the information from said representative signal has been processed by said control circuit (6).

* * * * *